United States Patent [19]

Saeki

[11] 4,386,397
[45] May 31, 1983

[54] METHOD AND APPARATUS FOR PROCESS CONTROL
[75] Inventor: Michio Saeki, Yokohama, Japan
[73] Assignee: Honeywell Inc., Minneapolis, Minn.
[21] Appl. No.: 216,029
[22] Filed: Dec. 12, 1980
[30] Foreign Application Priority Data Dec. 18, 1979 [JP] Japan .............................. 54-163582
Dec. 27, 1979 [JP] Japan .............................. 54-170920

[51] Int. Cl.³ ....................... G05B 11/00; G05B 13/02
[52] U.S. Cl. ................................... 364/148; 364/164; 364/165; 364/181; 318/561
[58] Field of Search ............... 364/148, 153, 158, 159, 364/160, 164, 165, 180, 181; 318/561, 611, 632

[56] References Cited
U.S. PATENT DOCUMENTS

| | | | |
|---|---|---|---|
| 3,728,526 | 4/1973 | Youngblood | 364/165 X |
| 3,767,900 | 10/1973 | Chao et al. | 364/164 X |
| 4,069,413 | 1/1978 | Rutledge et al. | 364/164 |
| 4,169,283 | 9/1979 | Lewis | 364/159 |
| 4,250,543 | 2/1981 | Smith et al. | 364/165 X |

*Primary Examiner*—Joseph F. Ruggiero
*Attorney, Agent, or Firm*—L. J. Marhoefer; Lockwood D. Burton; Mitchell J. Halista

[57] ABSTRACT

A method and apparatus for process control of batch processes utilizing the steps of storing in a memory the actual measured values of the process variable and utilizing the memorized values for an estimative operation to determine the timing for supplying a manipulated variable to the process. Thus, the process control apparatus of the present invention commits to memory the actual measured values of the process variable, utilizes the memorized values for the estimative operation to determine the point of time for suspending the supply of the manipulated variable and the point of time for starting the regular constant value control and, based on the outcome of this estimative operation, effects the separation of the process control under the steady condition from the control under the transient condition. Such a control operation ensures that the control value is not increased beyond its limit and, at the same time, it permits the adjusting period to be reduced to the minimum.

5 Claims, 10 Drawing Figures

METHOD AND APPARATUS FOR PROCESS CONTROL

BACKGROUND OF THE INVENTION

1. Field of the Invention

The present invention relates to a method and apparatus for controlling process variables. More particularly the present invention is directed to a method and apparatus applicable to a batch process control whereby the value of the process variable may be quickly brought to its target or setpoint value from the beginning of the process without overshoot.

2. Description of the Prior Art

In the prior art methods, it has been usual that the process control is begun manually and, when the value of process variable has become a predetermined one, in other words, when the deviation of the value of process variable from the setpoint value has decreased into a predetermined range, the manual control is switched to an automatic one to prevent the controlled value from exceeding its limit. However, it is very difficult to preclude such limit excess of the controlled value and to also make the adjusting period a minimum time. The reason for this difficulty is as follows: When the manual output in the manual control is shifted in the direction (maximum or minimum) of increasingly affecting the process variable for the purpose of minimizing the adjusting period, the process variable may quickly reach the target value. On the other hand, the change in the process variable may not follow the abrupt change in the manipulated variable owing to the process characteristic, and the process variable cannot be free from the influence of such abrupt change. As a result, there are involved contradictory characteristics such that the controlled value change inevitably either entails an overshoot when the deviation for determining the timing of switching the control from manual to automatic is minimized or an increase of the adjusting period when the deviation is set larger to avoid overshoot. For this reason, it has been difficult to obtain a good initial characteristic in process control. Particularly, in case of the subject to be controlled whose process characteristic is known with minimum information, it has been difficult to secure a good initial characteristic of the process control.

SUMMARY OF THE INVENTION

An object of the present invention is to provide an improved process control method and apparatus by which it is possible to control the process automatically from the beginning; to minimize the adjusting period; to preclude the excess or overshoot of the controlled value; and to secure a highly improved initial characteristic in the process control.

In accomplishing this and other objects, there has been provided, in accordance with the present invention, a process control method and apparatus wherein the measured values of the process variable are stored from the beginning of the process to memorize the values of the process variable along the process time; the stored values are used to estimate when and what peak value of the process variable is obtained, if the manipulated variable giving a change to the process variable is stopped at an arbitrary time in the course of control; the manipulated variable is stopped at the time when the estimation indicates that the estimated peak value of the process variable will reach a predetermined target value; the manipulated variable is held under the stop condition until the estimated peak value is realized and the control is switched to a conventional PID or time-proportional controller during the time until the peak value is reached, thereby achieving a set value control by which the process variables are held at a predetermined value.

BRIEF DESCRIPTION OF THE DRAWINGS

A better understanding of the present invention may be had when the following detailed description is read in connection with the accompanying drawings, in which.

In short, according to the present invention, there is provided an automatic process control method, by which the timing of switching the process from the uncontrolled state to the controlled or vice versa is determined completely in an automatic fashion.

First, to facilitate the understanding of this invention, the response characteristic of a normal industrial object to be controlled will be described.

Figure 1:
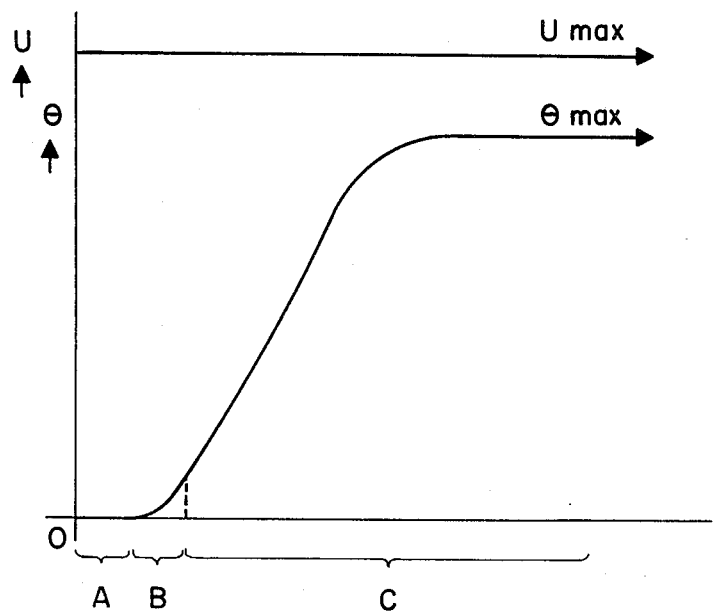
FIG. 1 is a waveshape diagram illustrating a step response of an process variable to be controlled.

When the manipulated variable is given by the step function, $U(t)=U_{max}$, the step response $\theta_{max}$ of the object to be process-controlled is illustrated in FIG. 1. There is observed no response in the initial section A because of idle or lag time of the response curve of the object to be process controlled, and then a rising characteristic due to a high-order delay of the system appears in the section B, and finally a rising characteristic due to a primary delay appears in the section C.

Figure 2:
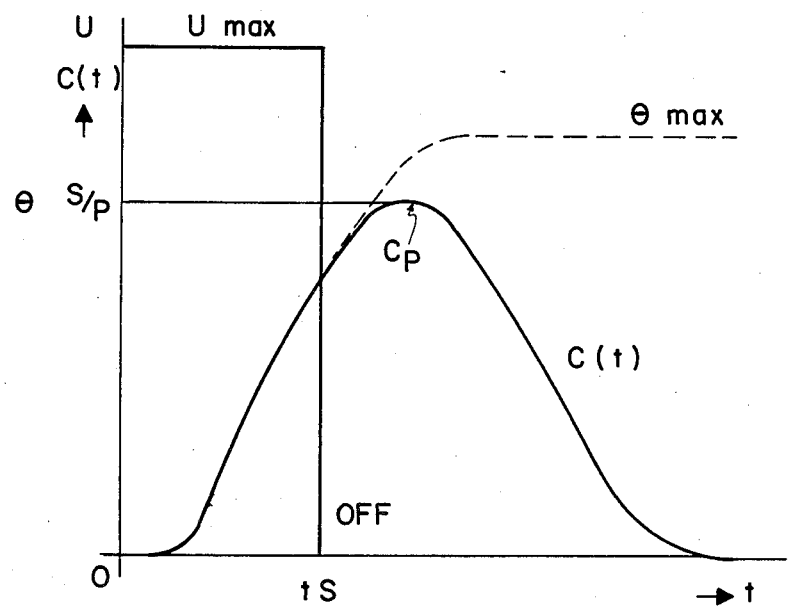
FIG. 2 is a waveshape diagram of pulse response obtained when the manipulated variable is in the form of a square-wave pulse.

When the manipulated variable $U[U=U(t)-U(t-ts)]$ having a form of a square-wave pulse as shown in FIG. 2 is given to the object having such a response characteristic as described above, the response will be represented by the curve C(t) of FIG. 2.

If, in this case, the peak value Cp of the response curve coincides with the setpoint value (S/P) of the process (generally the difference between the two values, namely, the deviation (S/P-Cp), falls within a stated value), it will be possible to adjust the process variable to a setpoint value in the shortest period without occurrence of overshooting by cutting off the manipulated variable at the time t=ts. Then, by shifting to the conventional PID control operation at the time "tc", the normal set value control may be continued with satisfactory control characteristic.

Figure 3:
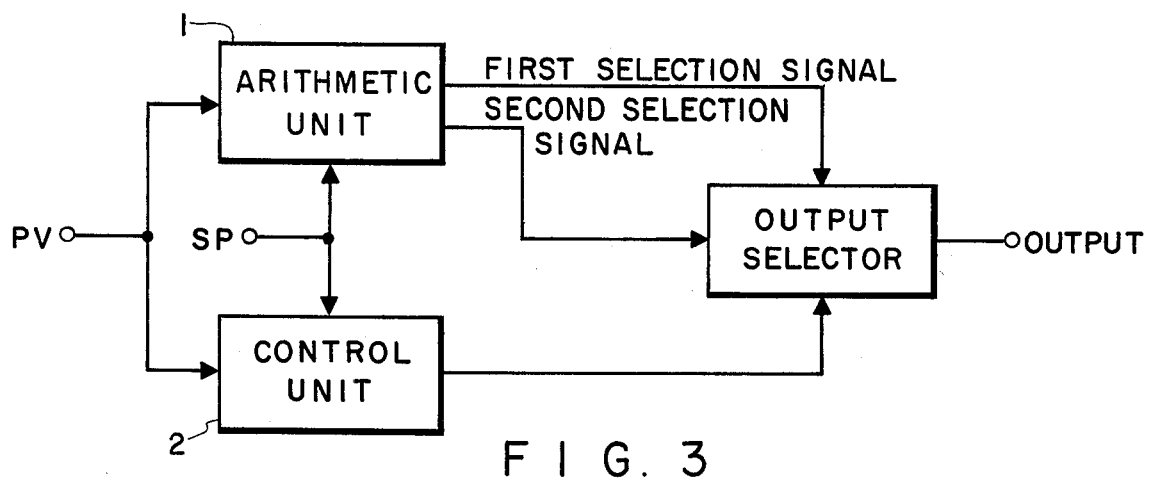
FIG. 3 is a block diagram illustrating the structure of the present invention.

This invention is based on a method which is depicted as a block diagram in FIG. 3. In FIG. 3, reference numeral 1 indicates the arithmetic control unit, which is adapted to provide the shortest adjustment operation. That is, the arithmetic unit 1 memorizes the actually measured values of process variable PV applied thereto and performs an arithmetic operation for estimating when the aforementioned estimated peak value reaches the predetermined range to the target SP value. Subsequently, arithmetic unit 1 produces a first output selection signal at the time ts when the arithmetic result indicates that the estimated peak value actually reaches the predetermined value, and, further, it produces the second output selection signal at the time tc. Still further the arithmetic unit 1 is constructed to give the aforementioned maximum or minimum manipulated output at least until the first output selection signal is generated. The conventional control unit 2 is adapted to give a normal manipulated output corresponding to the differential input when the second output selection signal is generated.

The first and second selection signals and the output of the control unit 2 are applied to an output selection unit 3 which is adapted to selectively supply the output from the control unit 1 as the manipulated output until the time ts at which the first output selection signal is generated and to select the output from the conventional control unit 2 after time tc at which the second output selection signal is generated. During the period from generation of the first output selection signal to that of the second one, an output is made neither from the unit 1 or the unit 2 and the input to the manipulated variable is cutoff.

In the following, it will be described how the control operation free from overshoot is realized in view of times ts and tc.

Figure 4:
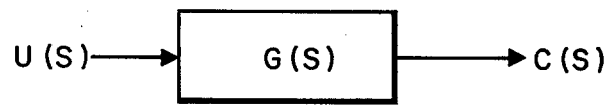
FIG. 4 is a diagram of the response of the object to be controlled.

FIG. 4 represents a diagram of the response of the object of the process control. The transfer function is denoted by G(s). When an input U(s) is applied as a manipulated variable to the object, the output response C(s) will be given by the following formula:

$$C(s) = G(s)U(s) \quad (s: \text{operator}) \qquad (1)$$

The manipulated variable of square-wave pulse (pulse width: ts) is equivalent to the sum of the step function $U(t) = U_{max}$ and the function $U(t-ts) = -U_{max}$. The response C(s) which is derived when such manipulated variable is applied to the object to be controlled is expressed by the following operator function.

$$C(s) = G(s) U_{max} \frac{1 - e^{-ts \cdot S}}{S} \qquad (2)$$

Expressing in terms of the time function, it becomes as follows:

$$C(t) = f(t) - f(t-ts) \qquad (3)$$

Figure 5:
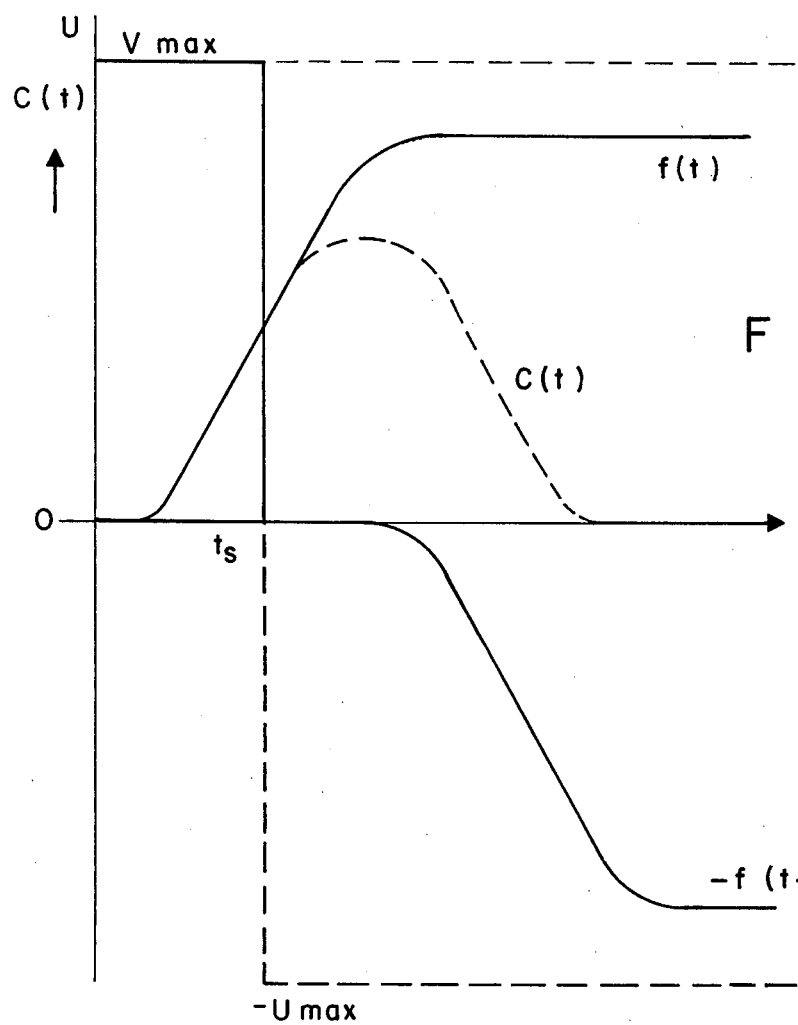
FIG. 5 is a waveshape diagram explaining the pulse response of FIG. 2.

As shown in FIG. 5, this is the sum of the response f(t) corresponding to the manipulated variable U(t) and the response $-f(t-ts)$ corresponding to the manipulated variable $-U(t-ts)$ which has the reversed sign and is given with a time delay of ts.

When the peak value Cp(t) is determined by using the response curve C(t) of Formula (3), the arithmetic operation for estimation may be carried out with respect to the period only after the time t=ts. Accordingly, by using a new axis coordinate $\tau$ in which t=ts is regarded as the origin of time, the equation (3) is transformed as shown below:

$$C(\tau) = fa(\tau) - f(\tau) \qquad (4)$$

Figure 6:
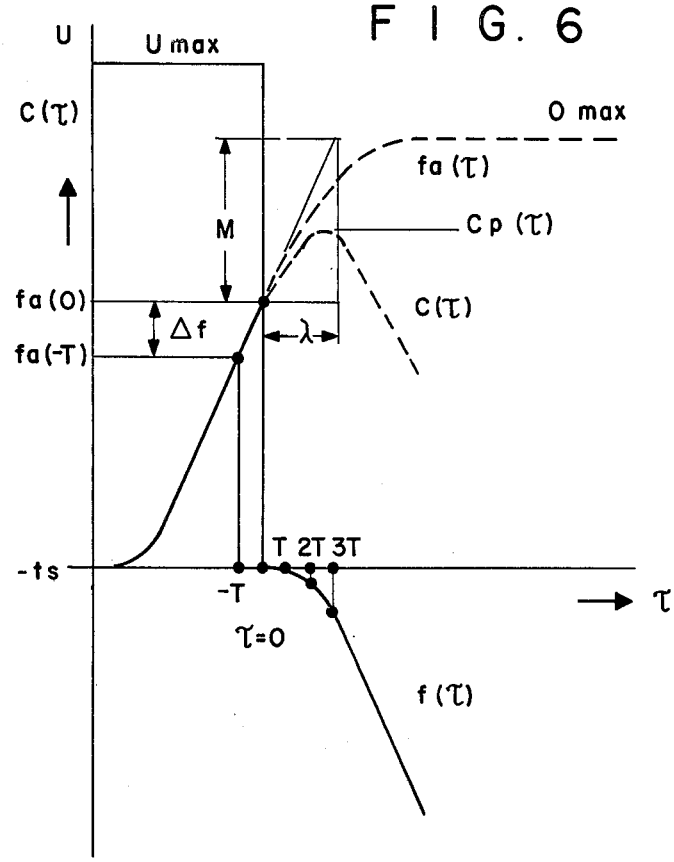
FIG. 6 is a waveshape diagram for explaining an estimating operation performed with respect to a process variable.

In equation (4), the term f($\tau$) represents the initial rising characteristic of the object as is clear from FIG. 6. It should be noted that this initial characteristic, namely the function f($\tau$) in the period from $\tau = -$ts to $\tau = 0$ represents the values of the process variable which have been taken during the process and that such values can be memorized and reserved as data in a memory device. For purpose of convenience, it will be called the initial characteristic data hereinafter. The term fa($\tau$) corresponding to the period after $\tau = 0$ may not be known in advance. For this reason, regarding the term fa($\tau$), it becomes necessary to introduce a formula of approximation proper to the object.

Now, for the convenience of description, the following explanation will be developed assuming that the change is continued with the gradient at $\tau = 0$ and that the final value of equilibrium $\theta_{max}$ of the object to be controlled is obtained at $\tau = 0$ when continuing to give the manipulated variable U only at the level $U(t-) = U_{max}$.

With this assumption, the term fa($\tau$) can be approximated as shown below:

$$fa(\tau) = fa(o) + M\left(1 - e^{-\frac{\tau}{\lambda}}\right) \qquad (5)$$

$$fa(o) = f(ts) = C)ts)$$
$$M = \theta_{max} - fa(o)$$

$$= M / \frac{d}{dt} fa(o)$$

In equation (5), the term fa)o) is known as already described, and the terms M, $\tau$ can be determined by respective calculations.

In view of equations (4), (5), therefore, the value C($\tau$) be immediately determined in accordance with the following formula:

$$C(\tau) = fa(o) + M(l - e^{-\tau/\lambda}) - f(\tau) \qquad (6)$$

According to this equation (6), the peak value of C($\tau$) at a given time and the time at which the peak value is generated can be instantaneously found by any known method of calculation.

Figure 7:
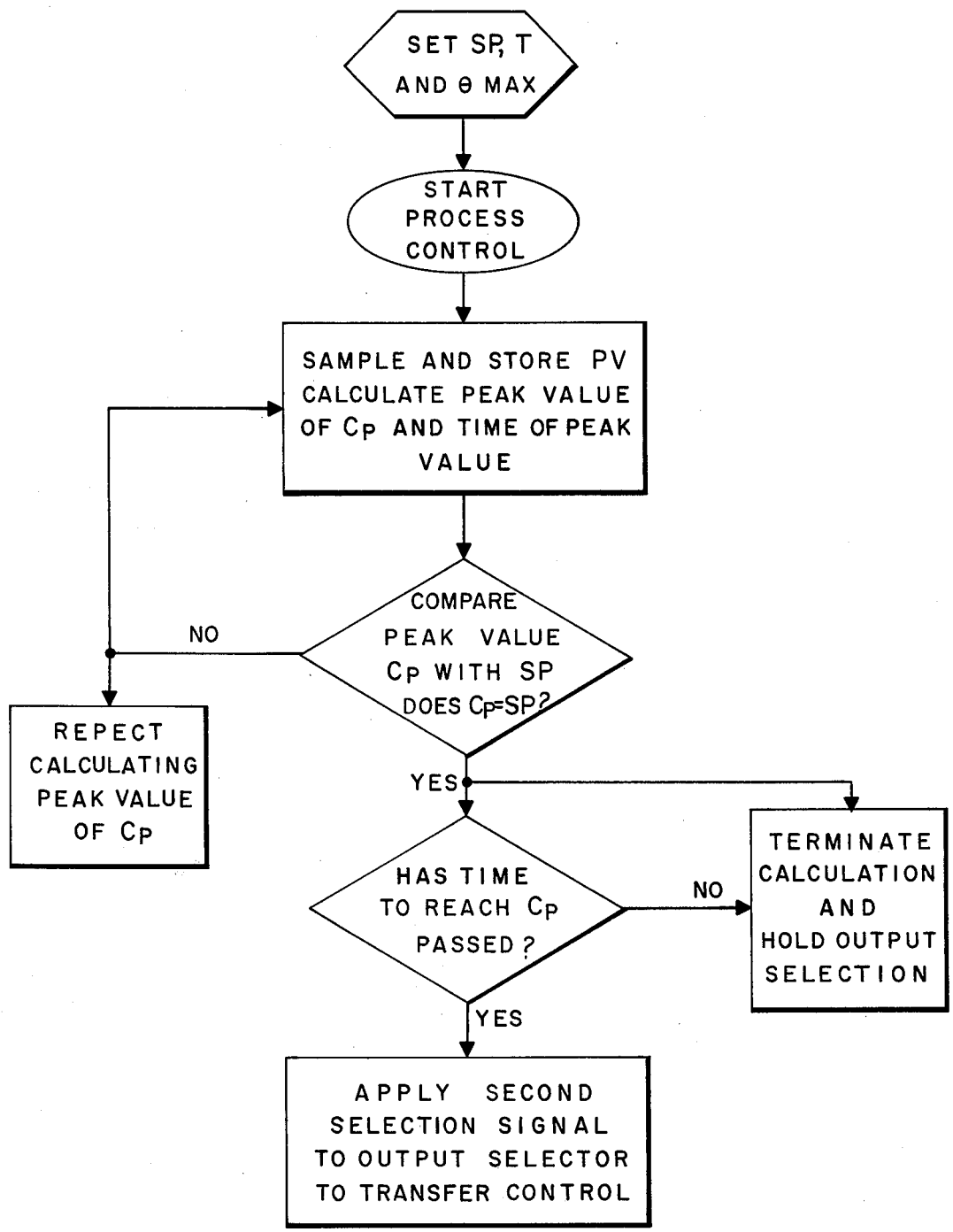
FIG. 7 is a flow chart of the estimating operation.

FIG. 7 is a flow chart of the embodiment of this invention, wherein the memorization of the initial characteristic data and the repetition of arithmetic operation for estimation are carried out for each sampling time. The procedure of the operation involved therein is as follows.

(1) Setting the values, namely setting the set process value S/P, the sampling time T and the final equilibrium value $\theta_{max}$; (2) Starting the control of process; (3) Memorizing and holding actually measured values of process variable for each sampling time T and, at the same time beginning the estimative calculation, namely calculating $$M = \theta_{max} - fa(o), f = fa(o) - fa(-T), \text{ and } \tau = M/\Delta f$$

and determining the estimated peak value Cp in accordance with Formula (6); (4) Comparing the estimated peak value Cp(τ) and the process setpoint value S/P; (No) If the estimative operation fails to give the result indicating that the estimated peak value will reach within a predetermined set process value, the estimative operation of (3) is repeated. In this case, the output selection unit 3 continues to select the output of the arithmetic control unit 1; (Yes) If the estimative operation indicates that the estimated peak value will reach within the predetermined value, the estimative operation is terminated and the first output selection signal is applied to the output selection unit 3. Then, the output selection unit 3 ceases to put out its output and is kept intact until the estimated peak value is achieved; (5) Monitoring the lapse of the time during which the estimated peak value actually occurs; (No) If the time to reach the estimated peak value has not passed yet, the output selection unit 3 still remains not operated until the time passes; (Yes) On lapse of the time mentioned above, the second output selection signal it put out to the output selection unit 3, which selects and put out the output of the control unit 2.

In this manner, the control after its start is carried out automatically. In the above example, the calculation of the peak value is performed at every sampling time, so that the period for retaining said suspended condition is obtained as a multiple of the sampling time. According to the process control method of the present invention, it is sufficient to set the process setpoint value S/P and the final equilibrium value $\theta_{max}$ as the basic parameters of the control. Thus, the value $\theta_{max}$ may be set rather coarsely. In one example, $\theta_{max}$ whose actual value is 120° C. was set at 144° C., and then the error of the peak value was a negligibly small level of 1.07%. Even in a system having a large idle or lag time in the order of hours, for example, the adjusting period can be reduced and the possible overshoot can be decreased notably because the value faithfully reflecting the characteristic of the object is used in the estimative operation.

Although the description of the foregoing embodiment has been limited to the start of the operation of process control, it will be readily understood that the method is also applicable with elimination of overshoot and with the reduction of the adjusting period, to the control of the case wherein, the setpoint process value is changed from that for its equilibrium state to that for another new state. In this case, either the initial characteristic data existing at the time the process control is started or the data after the set process value has been changed may be utilized as an initial characteristic data.

When the estimated value $\theta_{max}$ of the equilibrium value of the object of process control is known in advance, the peak value thereof can be estimated more accurately. Even if the estimation involves a large deviation, the error of the peak is relatively small as already described.

If the final equilibrium value $\theta_{max}$ totally cannot be estimated, so that there is a possibility of the estimated value widely deviating from the actual value and the actual peak value of process variable widely differing from the peak value Cp determined by the estimative operation, no serious problem is encountered because the normal control at the constant value is started at the end of the non-control state. To avoid the trouble of this nature, the process control method may incorporate an additional function such that the normal control is started by using the actual value of process variable when the control error has become smaller than a stated value.

In summary, the process control is commenced by giving 100% of the manipulated variable from the beginning of the operation. This 100% supply of the manipulated variable is subsequently cut off at a time in response to the information obtained by the estimating operation. This cut-off condition is maintained for a period which is also determined by the estimating operation. Then, the control is shifted to a conventional constant value control at the end of the period.

In other words, this invention makes it possible to automatically carry out the process control by determining when the 100% manipulated variable supply is to be terminated to introduce the non-control state and also when the non-control state is to be terminated to shift the process under the normal constant value control in accordance with the outcome of the estimative operation.

Figure 8:
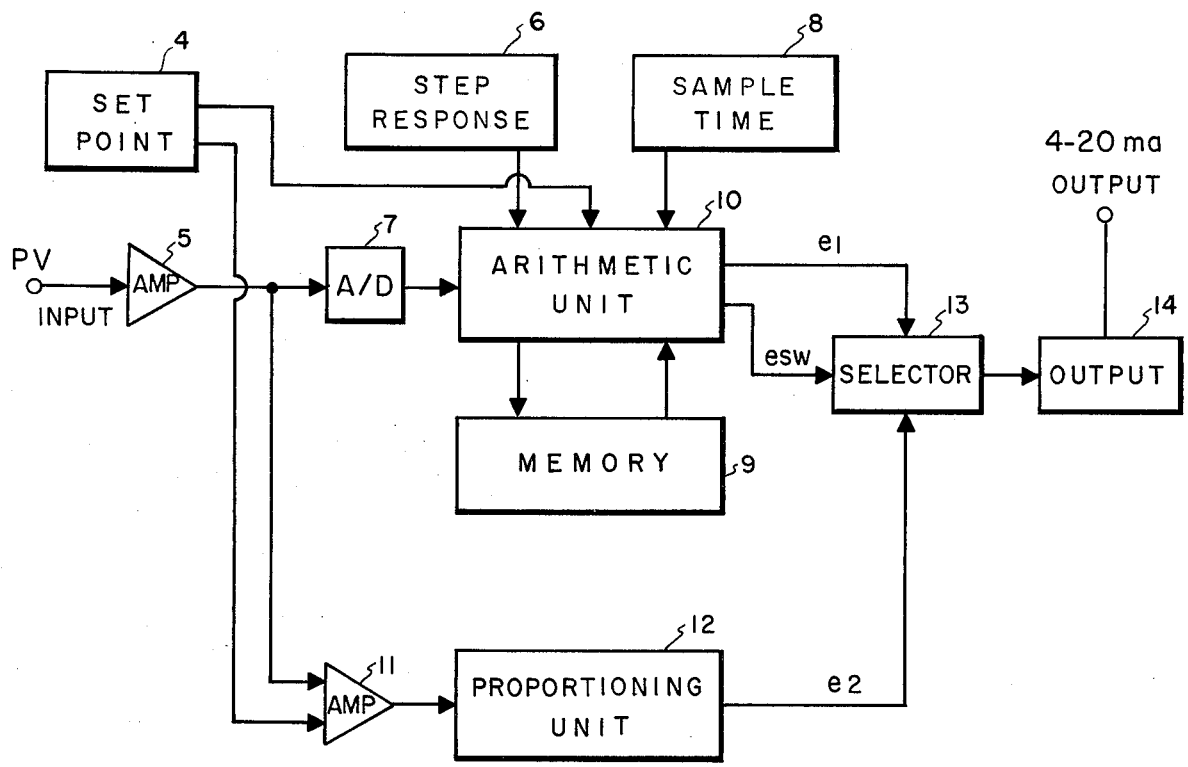
FIG. 8 is a block diagram illustrating an example of an apparatus embodying this invention.

FIG. 8 is a block diagram illustrating an example of an apparatus according to this invention. In this figure, reference number 4 denotes a setpoint means for setting a process setpoint value S/P. A preamplifier 5 is used to amplify a process variable PV input. A means for setting a parameter 6 gives an assumed step response characteristic of the object to be controlled. The output of the preamplifier 5 is applied to an analog-digital converter 7 for converting the analog value of the process variable from the preamplifier 5 into a digital value. A means for setting 8 is used for setting a sampling time T. A memory circuit 9 is provided for memorizing and storing actually measured values of process variable at every sampling time T. A central processing arithmetic unit 10, e.g., a digital computer, receives the process setpoint value from the setpoint means 4, the parameter from the step response setting means 6, the sampling time from the sample time means 8, the value of process variable from the analog-digital converter 7, and the value of process variable from the memory circuit 9, and then delivers the outcome of the estimative operation as its output.

A differential amplifier 11 amplifies the difference between the process setpoint value from the stepoint means 4 and the value of process variable from the preamplifier 5. A time-proportional circuit 12 is used for changing the ratio of the ON time to the OFF time in the ON-OFF operation in proportion to the controlled deviation rceived from the differential amplifier 11. An output selection circuit 13 receives a binary signal $e_1$ of "0" or "1" corresponding to the manipulated variable signal level of 0% or 100%, respectively, an output selection signal $e_{sw}$ from the central processing unit 10 and an output $e_2$ of "0" or "1" from the time proportional circuit 12 and, then, transmits a selected output under the control of the output selection signal $e_{sw}$.

Finally, an output circuit 14 is used to convert the output of the output selection circuit 13 into a 4 to 20 mA signal and to supply it as the output of the control apparatus.

The operation of the apparatus constructed as described above will now be described.

The measured process variable signal from the preamplifier 5 is converted by the A/D converter 7 into a corresponding digital signal which, in turn, is transmitted to the central processing unit 10. In accordance with the set sampling time T from the sample time means 8, the central processing unit 10 samples the process variable signals at intervals of this sampling time and stores the sampled values in the memory circuit 9.

In other words, the memory circuit 9 preserves the sampled values of the process variable. On the other hand, the central processing arithmetic unit 10 also performs the estimative operation by deducting the sampled value of process variable from the assumed step response characteristic curve predetermined by the parameter setting means 6 and produces the outcome of this estimative operation as its output. This function of the central processing unit 10 will be described in further detail hereinbelow with reference to FIG. 9.

When an input in the form of a square-wave pulse is given as the manipulated variable U(s), which is:

$$U(s) = U_{max} \times \frac{1 - e^{-ts \cdot S}}{S} \tag{1}$$

(ts: pulse width, s: operator) to the object which is represented by the transfer functin G(s), the output response C(s) is expressed as follows:

$$C(s) = G(s) U_{max} \times \frac{1 - e^{-ts \cdot S}}{S} \tag{2}$$

Being expressed in terms of time function, the equation is as follows:

$$C(t) = f(t) - f(t - ts) \tag{3}$$

Figure 9:
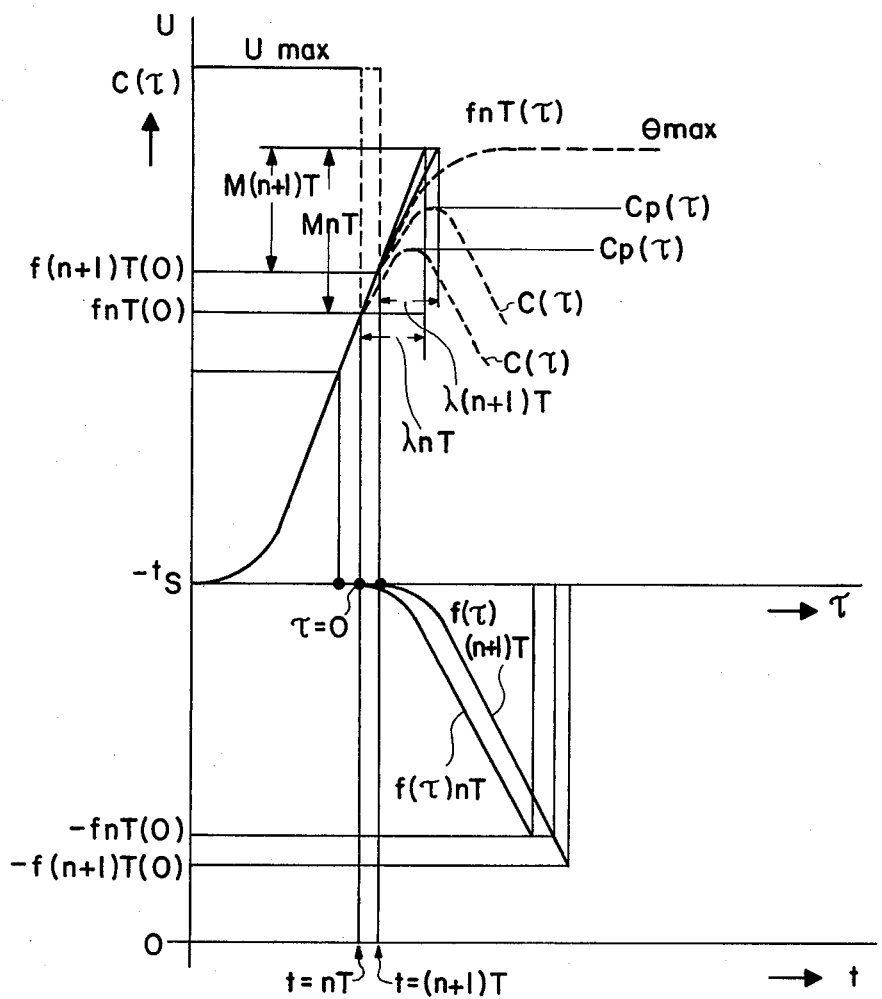
FIG. 9 is a waveshape diagram for explaining the operation of the central processing unit of FIG. 8.

As shown in FIG. 9, this implies the sum of the step response f(t) corresponding to $U(t)=U_{max}$ and the step response $-f(t-ts)$ corresponding to $U(t-ts)=U_{max}$, which is derived by reversing the sign of the step response f(t) and giving a time delay of ts. Thus, the peak value of C(t) appears at a point after t=ts.

If the central processing unit 10 turns off the manipulated variable at every sampling time, this will imply that the unit is performing an arithmetic operation to determine when the value of process variable reaches its peak and what the peak value is.

That is, the unit is calculating out the peak value Cp(t) of the assumed step response curve. In this case, the calculation of this peak value may be carried out with respect to the time after the present moment. Accordingly, assuming that the present moment is expressed as t=nT (n: the number of samplings up to the present moment), the equation of formula (3) should be expressed in terms of a new time axis coordinate in which t=nT is defined as a new origin of time. That is:

$$C(\tau) = f_{nT}(\tau) - f(\tau) \quad (n = 1, 2 \ldots j \ldots) \tag{4}$$

As is noted from FIG. 9, the term f(τ) in the equation of equation (4) is the sampled values of process variable obtained between the two points of time, t=0 and t=nT.

However, the terms $f_{nT}(\tau)$ after the point τ=0 has an unknown value. Generally, this value is not known in advance. With respect to this term $f_{nT}(\tau)$, therefore, an equation of approximation proper to the object to be controlled must be introduced. This equation of approximation is given by the step response parameter setting means 6. The equation may be given in the form of tangential approximation function, for example. However, for the convenience of description, the following explanation will be developed on the assumption that the change is continued with the gradient at the time τ=0, that the manipulated variable U is supplied always at maximum i.e. $U(t)=U_{max}$, and that the final value of equilibrium $\theta_{max}$ of the object is achieved at τ=λ(λ: time constant).

Consequently, the function $f_{nT}(\tau)$ can be approximated as indicated by the following equation.

$$f_{nT}(\tau) = f_{nT}(O) = M_{nT}\left(1 - e^{-\frac{\tau}{\lambda_{nT}}}\right) \tag{5}$$

wherein, $f_{nT}(O) = f(t)_{t=nT} = C(t)_{t=nT}$ $M_{nT} = \theta_{max} - f_{nT}(O)$ $\lambda_{nT} = M_{nT}/[f_{nT}(O) - f_{nT}(-T)]$ In equation (5), the term $f_{nT}(O)$ represents an actually measured value thus being a known value, while the terms $M_{nT}$ and $\lambda_{nT}$ can be determined by the calculations described above.

The term G(τ) of the equation (4) in FIG. 9, therefore, can be immediately determined in accordance with the equation of the following formula.

$$C(\tau) = f_n(O) + M_n\left(1 - e^{-\frac{\tau}{\lambda_n T}}\right) - f(\tau) \tag{6}$$

The central processing unit 10 continues to compute the peak value of C(τ) of equation (6) at every sampling time until the aimed at value is obtained.

For example, the arithmetic operation at t−nT (τ=0) is as follows:

The increment ΔC(k+1.T) of the estimated value C(τ) with respect to two adjacent sampling times after the present moment is determined by the following equation (7):

$$C(\overline{k+1} \cdot T) = \left[f_{nT}(O) + M_n\left(1 - e^{-\frac{\overline{K+1} \cdot T}{\lambda NT}}\right) - f(\overline{k+1} \cdot T)\right] - \left(f_{nT}(O) + M_{nT}\left(1 - e^{-\frac{KT}{\lambda NT}}\right) - f(k\,T)\right) \tag{7}$$

Then, the set process value is compared with the value C(kT) which is regarded as the peak value of C(τ) at t=nt when the sign of the increment $\Delta C(\overline{k+1}.K)$ is changed from plus to minus. If the difference between the set process value S/P and the peak value does not fall within the predetermined range, the peak value is determined by following the preceding procedure in accordance with the formula:

$$\Delta C(k + 1 \cdot T) = \left[f_{(n+1)T}(O) + M_{(n+1)T}\left(1 - e^{-\frac{K+1 \cdot T}{\lambda(n+1)T}}\right) - f(k + 1 \cdot T)\right] -$$

$$\left[ f_{(n+1)T}(O) + M_{(n+1)T}\left(1 - e^{-\frac{KT}{\lambda(n+1)T}}\right) - f(kT) \right]$$

by assuming the next sampling time, $t=(n+1)T$, ($\tau=0$) and it is compared with the process setpoint value S/P. If the difference still fails to fall within the range, the same operation is performed with respect to the subsequent sampling time.

However, at a certain sampling time, $t=NT=ts$ (again the arithmetic operation is performed by taking this point of time as $\tau=0$), the peak value $Cp(\tau)$ of the estimative operation is given as indicated by the following equation:

$$Cp(\tau)_{\tau=k} = f_{NT}(O) + M_{NT}\left(1 - e^{-\frac{KT}{\lambda NT}}\right) - f(kT)$$

and this value is compared with the process setpoint value S/P and the difference is found to fall within the range. At this sampling time $t+NT$, the central processing unit 7 sends out a signal for stopping the supply of the manipulated variable U. That is, the signal $e_1 = $ "0" is converted from $e_1 = $ "1". Upon lapse of the time kT from the point $t=NT$, the central processing unit 10 sends out the output selection signal $e_{sw}$ and causes the output selection circuit 13 to make a selection of the output $e_2$ from the proportionating circuit 12.

The lapse of time kT implies the point at which the sampling number K retained in a counter (not illustrated) is decreased one by one at every sampling times after the point $t=NT$ and finally reduced to 0.

As described above, the central processing unit 10 determines the difference between the value of output response $f_{jT}(O)$ at every sampling time and the final value of equilibrium $\theta_{max}$, that is, $M_{jT} = \theta_{max} - f_{jT}(O)$ and the time constant $_{jT} = M_{jT}/[f_{jT}(O)-f_{jT}(-T)]$, then determines the peak value from the equation of approximation of equation (5) in accordance with the procedure described above, and discontinues, i.e., cuts off, the supply of the manipulated variable at the point of sampling time at which the estimative operation indicates that the peak value satisfies the predetermined relationship with the set process value. Then, the apparatus retains such a cut off condition for a period as determined by the estimative operation and, thereafter, shifts the process control to the normal constant value controller 2.

By the process control apparatus of the present invention, since the sampled values of process variable which faithfully represent the characteristics of the object to be controlled are used in the estimative operation, the adjusting time can be reduced to the minimum and the possible excess of the control value can be notably decreased as compared with the conventional control apparatus.

Further, the assumed step response characteristic can be determined by a relatively simple formula. This is because the important thing is only the approximation of the assumed step response characteristic near or after the point of time at which the estimative operation tells that the calculated peak value will come in the predetermined relationship against the set process value, but the assumed step response characteristic obtained as initial characteristic data has no effect whatever upon the outcome of the estimative operation. This means that the estimative operation can be started at the point of time which may be fixed in due consideration of the characteristics of the object to be controlled, the set process value, etc. Moreover, the apparatus performs the control by dividing the process into two zones, that is, one with larger deviation and the other with smaller deviation. The central processing unit 10 may be composed of an integrated circuit chip, i.e., a microprocessor, whereby it can be readily incorporated in the conventional adjusting instrument, which will significantly enhance the performance of the instrument.

Although the foregoing description of the apparatus shown in FIG. 8 has been limited to the start of the operation of process control, it will be readily understood that it similarly applies to the process control at the time that the set process value is changed. When a sudden change is made in the set process value and, as a result, the deviation is allowed to increase on the positive side, for example, the apparatus manages the control effectively by converting the output $e_1$ of the central processing unit 10 to "1", causing the output selection signal $e_{sw}$ to select and deliver this particular output signal $e_1$ and, at the same time, making the central processing unit 10 perform the aforementioned estimative operation. In this case, the data to be obtained after the change of the set process value may be utilized.

Where the response characteristic of the subject of the subject of process control is known in advance, the results of the estimative operation including the peak value and other data are quite accurate. Even when the set value $\theta_{max}$ involves an error of about 10% from the actual value, the error between the actual peak value and the calculated peak value is negligibly small.

Figure 10:
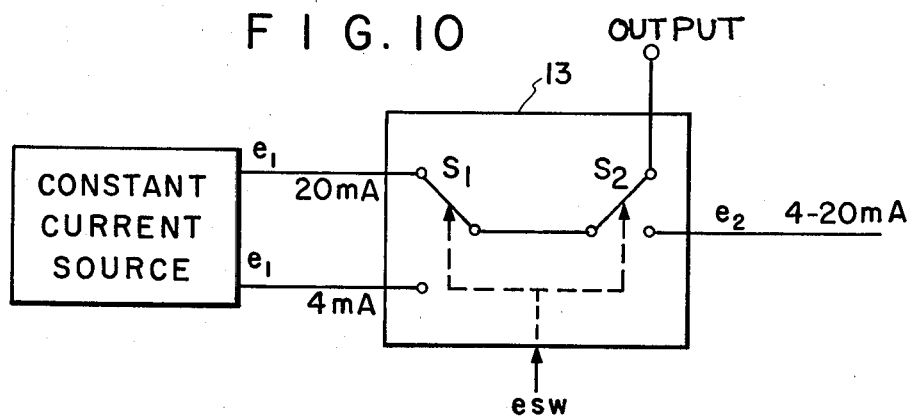
FIG. 10 is a schematic diagram illustrating an example of an output selection circuit.

When a regulating device having an integrating function is used in the place of the time-proportional circuit 12, the problem of reset windup can be very readily solved by introducing a modification such that the control deviation signal is admitted through a control switch which is closed exclusively when the output selection signal $e_{sw}$ selects the output $e_2$ from the differential amplifier 8. Further, the control constant can be determined only by taking into consideration the improvement of the characteristic of the constant value control.

Where the output $e_2$ is produced in the form of an analog signal such as the signal of 4 to 20 mA, the output signal $e_1$ may be obtained in the form of a current signal from the source adapted to give a current signal of 20 mA for designating 100% of the manipulated variable and a current signal of 4 mA for designating 0% of the variable, and the output selection circuit 10 may be composed of two selection switches $S_1$, $S_2$ as illustrated in FIG. 10, with the switch control between the two switches $S_1$, $S_2$ relying upon the output selection signal $e_{sw}$ so that the selection of $e_1 = 20$ mA continues until the estimative operation produces the results corresponding to the predetermined relationship between the peak value and the set process value and the selection of $e_2 = 4$ mA occurs when such results are obtained, namely the selection of the output $e_2$ between the two currents, 4 and 20 mA, is effected at the point of time of the actual occurrence of the peak value which is determined by the estimative operation.

As is clear from the foregoing description, the process control apparatus of the present invention commits to memory the actual measured values of the process variable, utilizes the memorized values for the estimative operation to determine the point of time for suspending the supply of the manipulated variable and the point of time for starting the regular constant value control and, based on the outcome of this estimative operation, effects the separation of the process control under the steady condition from the control under the transient condition. Thus, it ensures that the control value is not increased beyond its limit and, at the same time, it permits the adjusting period to be reduced to the minimum.

Accordingly, it may be seen that there has been provided, in accordance with the present invention, an improved process control method and apparatus.

The embodiments of the invention in which an exclusive property or privilege is claimed are defined as follows:

1. A method of controlling a process, with which the process variable may quickly come to a process setpoint value at the beginning part of the process control or when the process setpoint value is changed, said method comprising the steps of memorizing measured values of the process variables; performing a deduction at an arbitrary time in the course of the control to deduct said memorized values from the approximated value of an assumed step response characteristic of the object to be controlled in response to the application of a manipulated variable thereto, thereby determining the estimated response value of the process variable after said arbitrary time; suspending the delivery of the manipulated variable to the object to be controlled at the time when the estimated operation indicates that the estimated response peak value will establish a predetermined relationship against the process setpoint value; retaining this suspended delivery of the manipulated variable for a calculated period which is necessary in order that the estimated peak value is actually achieved; and switching the control to a constant value control system when said period has elapsed, thereby the process control being performed without overshoot of the process setpoint value.

2. The method according to claim 1, wherein the steps of memorizing measured values and calculating the peak value of the estimated response characteristic are repeated at every one of a plurality of sampling times and the period of suspending the manipulated variable supply is obtained as a multiple of the sampling time.

3. An apparatus for process control comprising sampling time setting means for setting a sampling time; parameter setting means for setting a parameter which is required for providing an assumed step response characteristic of the object to be controlled in response to the application of a manipulated variable thereto;

setpoint value setting means;

memory means for memorizing measured values of the process variable obtained at said sampling time;

arithmetic operation means for deducting at said sampling time said memorized values of process variable from the values of the assumed step response characteristics by setting the parameters of the object to be controlled after the time of sampling and for calculating the peak values and the period to reach said peak value, comparison means for comparing the peak value calculated by said arithmetic operation means with a process setpoint value from said setpoint means, constant value control means connected to said comparison means for producing an adjusting signal corresponding to the difference between the value of the process variable and the process setpoint value, and output selection means responsive to said arithmetic means and said constant value control means to supply a control signal to energize a source of a manipulated variable affecting said process variable to supply said manipulated variable, and adapted to cut-off the supply of said manipulated variable by deenergizing the source when said comparison means produces results of an arithmetic operation showing the establishment of the predetermined relationship between said calculated peak value and said set process value, to retain said cut-off condition for a period until the appearance of the calculated peak value, and to make a selection of the output of said constant value control means upon a lapse of said period and to supply the selected output as an operating output to the manipulated variable source.

4. An apparatus for process control according to claim 3, wherein said constant value control means includes an integrating means, said constant value control means receiving the differential signal between the process variable signal and the process set value signal via switch means which is turned on or off with the comparison means.

5. An apparatus according to claim 3 wherein said arithmetic operation means includes a digital computer.

* * * * *